Nov. 21, 1967 E. A. CARSEY 3,353,340

OIL MIST AND FLOTATION DUST COLLECTOR

Filed June 22, 1966 2 Sheets-Sheet 1

INVENTOR.
Eugene A. Carsey
BY
ATTY.

Nov. 21, 1967   E. A. CARSEY   3,353,340
OIL MIST AND FLOTATION DUST COLLECTOR
Filed June 22, 1966   2 Sheets-Sheet 2
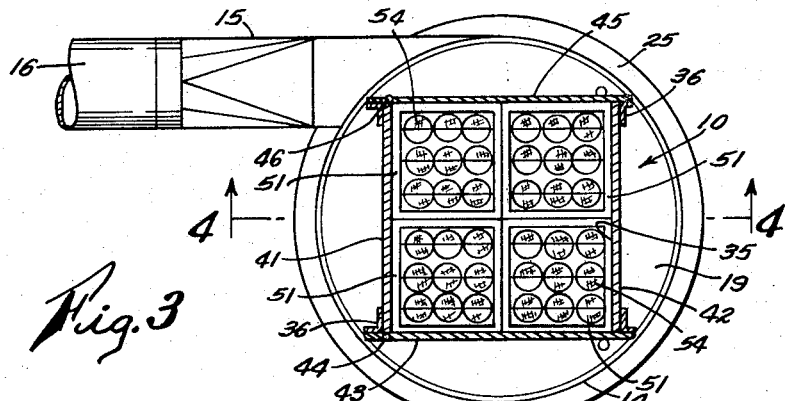
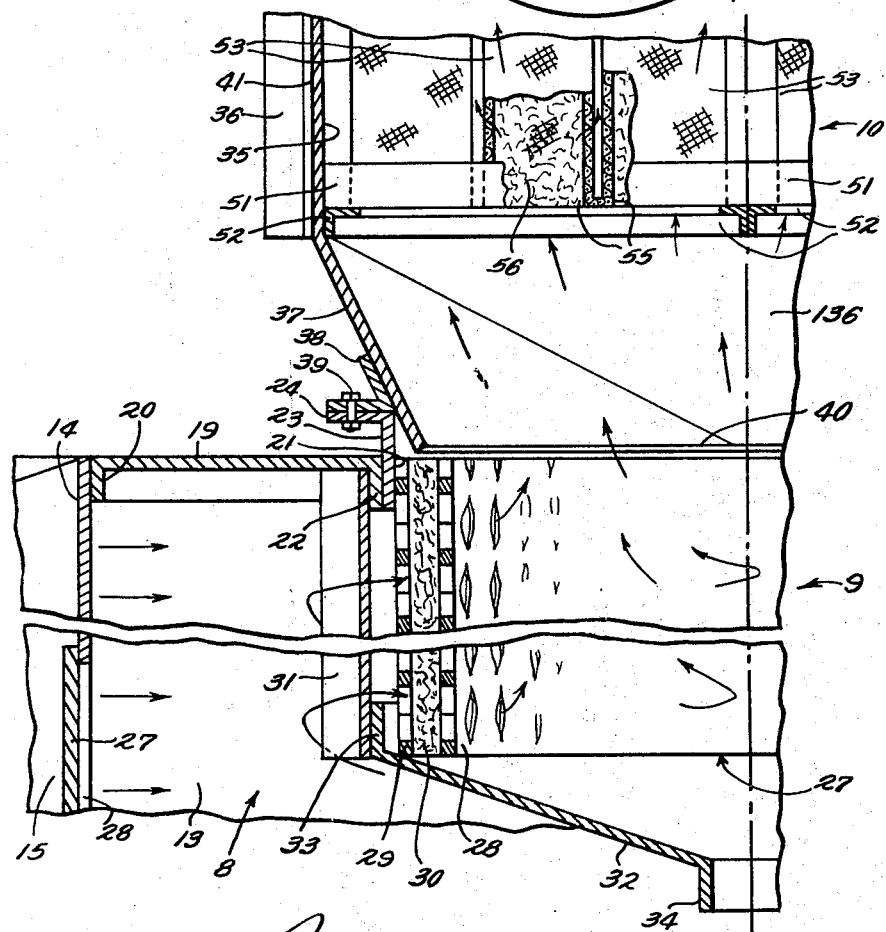
INVENTOR.
Eugene A. Carsey
BY
ATTY.

United States Patent Office 3,353,340
Patented Nov. 21, 1967

3,353,340
OIL MIST AND FLOTATION DUST COLLECTOR
Eugene A. Carsey, Cincinnati, Ohio, assignor to The Kirk & Blum Manufacturing Co., Cincinnati, Ohio, a corporation of Ohio
Filed June 22, 1966, Ser. No. 559,592
1 Claim. (Cl. 55—324)

ABSTRACT OF THE DISCLOSURE

An oil mist and flotation dust separator having a first cyclonic separation stage, a second cylindrical filter stage and a third filter bag stage is arranged with the second cylindrical filter stage within the first cyclonic separation stage and with the third bag filter stage mounted over the outlet of the second cylindrical filter stage.

---

The present invention relates to improvements in oil mist and flotation dust control collectors that are generally useful in collecting oil mists, flotation dust and other solid particulate caused by wet machining operations in manufacturing plants.

It is an object of this invention to provide a multistage, oil mist and flotation dust control collector for manufacturing plants that is highly efficient because of the novel association of its several stages and the improved functions attained thereby; the degree of dust separation securing permissible cleaned air return to the plant area.

Another object of the invention is to provide a multistage relatively inexpensive and compact collector that will insure a high separation factor of contaminant ladened air exhausted from around the working areas of wet machining stations; the contaminant in such air being predominantly oil mist, dust and small amounts of metal particles, and the like.

Further objects of the invention will become apparent from the following specification taken in conjunction with the accompanying drawings depicting a preferred embodiment thereof.

In the drawings:

FIG. 3 is a section taken on line 3—3 of FIG. 1.

FIG. 4 is an enlarged, fragmental section taken on line 4—4 of FIG. 3.

Figure 1:
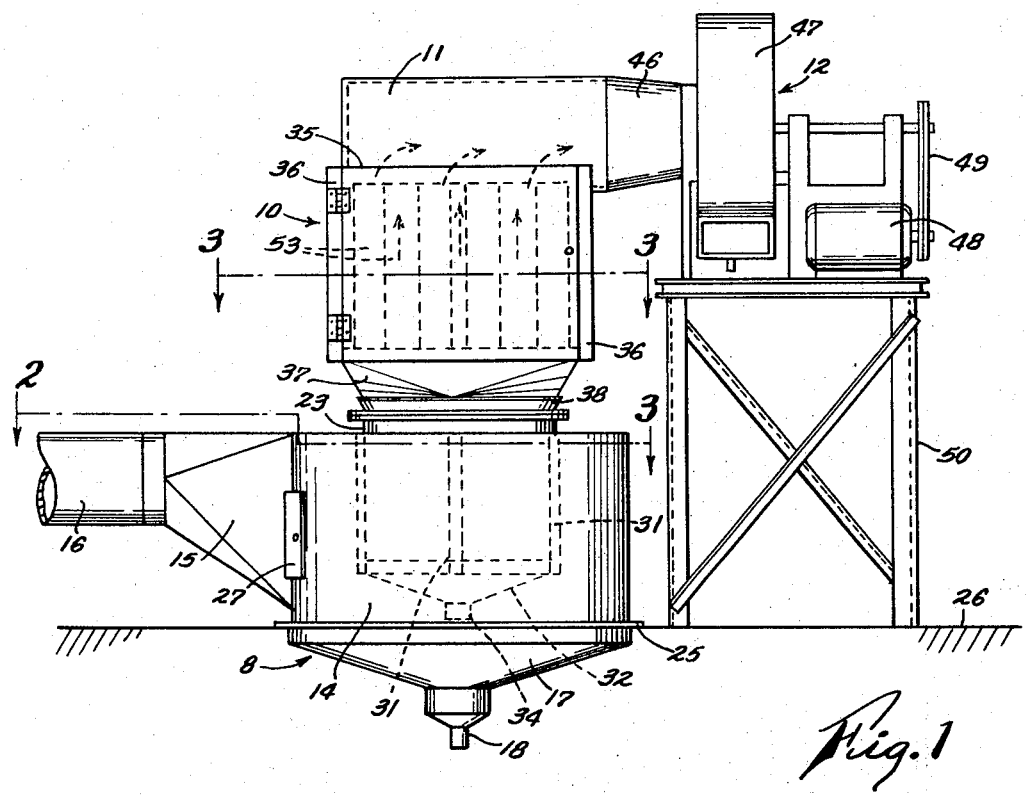
FIG. 1 is a side elevational view of my oil mist and flotation dust control collector.
Figure 2:
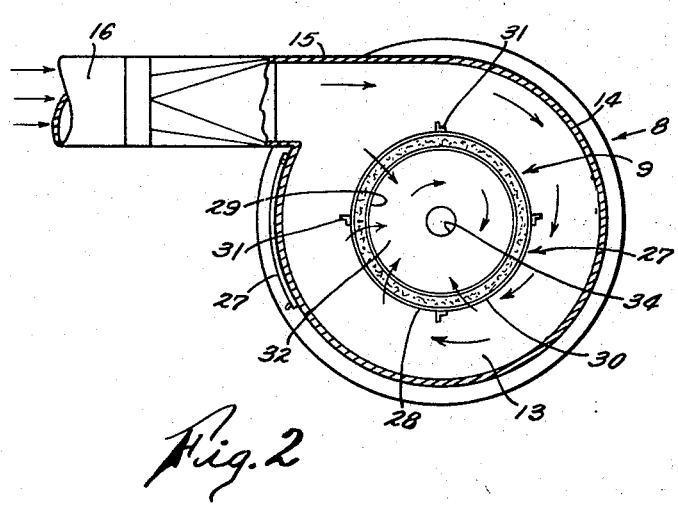
FIG. 2 is a section taken on line 2—2 of FIG. 1.

In the drawings the numeral 8 refers generally to a first stage, centrifugal separator that contains a second stage primary filter 9, said stages having positioned above them a third stage bag filter 10; the latter being provided with a bonnet 11 that is connected to an air exhaust fan means 12. As best shown in FIGS. 1 and 2 the first stage separator 8 comprises an annular chamber 13 having an outer, cylindrical wall 14 provided with a tangential inlet 15. The inlet is connected to a pipe 16 that has its remote end connected to a hood or nozzle adjacent conventional metal working devices (not shown), which employ wet machining processes generating undesirable oil mist. As oil mist surrounds the location of the wet machining apparatus a velocity air stream is produced around the operation by the intake nozzle or hood connected to the pipe 16 and the moving air captures all of the oil mist and also entrains factory flotation dust and some of the lighter metal particles created by the operation and carries them through the pipe 16 into the chamber 13 by way of the inlet 15.

The bottom of the cylindrical wall 14 is closed by a drain pan 17 that discharges residue oil and particulate through a drain pipe 18 for reclamation, or which may be disposed of by other means. The upper end of the cylindrical wall 14 is closed by an annular top wall 19 formed with a downturned peripheral flange 20 (FIG. 4) which is welded or otherwise secured to the upper internal edge portion of the wall 14, said top wall having a large concentric opening 21 formed therein that is bounded by a downturned marginal flange 22. An annular collar 23 is welded or otherwise secured to the marginal flange 22 and has an outturned annular bolting ring 24 formed thereon. The pan 17 has an outturned peripheral flange 25 (FIG. 1) formed thereon which rests upon a collector supporting surface 26 such as a factory floor, or the like; while the wall 14 has a door 27 for closing an access opening 28 formed therein.

The second stage primary filter 9 comprises a filter cartridge 27 positioned centrally within the upper part of the chamber 13 and having a centrally located radially spaced, outer and inner cylindrically formed, perforate guard 28 and 29, respectively, each guard preferably made of expanded metal and having a layer of thick, copper wool, metal strands or glass fiber 30 disposed therebetween. The filter cartridge 27 is positioned within the opening 21 in the top wall 19 by a number of angularly spaced apart, downwardly extending angle irons 31 that have their upper ends welded, or otherwise connected to the outside surface of the flange 22. A conical drain pan 32 has an upturned, peripheral lip 33 formed thereon which is welded to the lower ends of the angle irons 31, the pan having a drain pipe 34 at its lowermost, central portion which is vertically above the drain 18 for the pan 17. As best shown in FIG. 4 the cartridge is disposed between the angle irons 31 and rests upon the outer portion of the pan 32, whereby oil trapped and entrained by the filter medium 30 will fall upon the pan 32 and flow through the drain 34 directly into the drain 18 for disposal.

The centrifugal action of the contaminated air within the chamber 13 created by its introduction thereinto through the tangential inlet 15 will cause the heavier metal particles and some of the dust and oil mist to contact and be deposited on the interior surface of the wall 14, such particles and oil flowing down the wall into the pan 17 and out through the drain 18. As best shown by the arrows in FIG. 2 the lighter oil mist will be carried by the whirling air inwardly and upwardly through the filter cartridge 27, dust and oil mist being made to effectively agglomerate and adhere to the copper wool layer 30 in said cartridge due to the transposition of energy that occurs as the centrifugal action of the air in the first stage separator changes to a fluid flow condition within the cartridge of the second stage primary filter.

The third stage bag filter 11 comprises a closed, rectangular compartment 35 having corner positioned, upstanding angle irons 36 which are welded, or otherwise secured, to an inwardly and downwardly tapering bottom wall 37, said wall forming a connecting passageway 136 (FIG. 4) between the compartment 35 and the interior of the cartridge 27. The bottom wall 37 has a mounting ring 38 connected to the bottom portion thereof and is secured to the flange 24 by bolts 39. It is to be noted with respect to FIG. 4 that the terminal inner portion of the bottom wall 37 is disposed inwardly of the mounting ring 38 whereby the lower edge 40 of the wall is disposed directly above the layer 30 of filter material in the cartridge 27 for the purposes to be described hereafter.

The compartment has a pair of walls 41 and 42 mounted by the angle irons on opposite sides thereof while the front of the compartment is closed by an access door 43 hinged at 44 on a corner angle iron 36; the opposite side of the compartment being closed by a door 45 hinged at 46 to the corner angle iron.

The bonnet 11 (FIG. 1) has its sides connected to the top end portions of the side walls 41 and 42 while the doors 43 and 45 close against the opposite sides of the bonnet to form an air tight bonnet and compartment connection. Air is exhausted from the bonnet 11 through a pipe 46 preferably connected to a side of the bonnet and which has its opposite end connected to the intake port of an exhaust fan 47, said fan being driven by a motor 48 through a pulley and belt arrangement 49. The fan and motor are mounted upon a suitable structure 50 resting upon the support surface 26.

Bag filters for the third stage 10 may comprise four abutting frames 51 supported upon an angle iron structure 52 interconnected in the form of a cross, the structure being mounted across the bottom portions of the side walls 41 and 42. Each frame 51 carries a number of upstanding, inverted bags 53 having closed upper ends 54 and, as shown in FIG. 4, having open bottom ends 55 that communicate with the passageway 136. The bags are sufficiently stiff to be self-erecting and are made of a perforate, fabric material lined with a coating of glass fiber 56 whereby air carrying small percentages of oil mist will pass through said bags and the mist will be entraned by the glass fiber liner; the oil that builds up inside the bags draining back through the passageway 136 into the second stage primary filter.

In operation the fan 47 exhausts air from the bonnet 11 through the pipe connection 46 and oil mist, flotation dust and metal particulate ladened air to be cleaned is drawn from the working areas of one or more wet machining stations to enter the tangential inlet 15 as a velocity air stream that is rapidly changed into a rising stream of whirling air and as such charged through the centrally located filter cartridge 27. The centrifugal action of the air stream in the annular chamber 13 separates the relatively heavier metal and dust particles and larger oil droplets by intercepting them on the wall 14 from whence said heavier contaminant is borne by the pan 17 into the drain 18.

Because of the transposition of vortical whirling air into fluid flow within the cartridge and the continued somewhat circular movement of the air through the cartridge 27 and up through the passageway 136 into the third stage filter, the oil mist collected on the inside of the bags 53 will be drained off and much of the bag drainage will fall onto the wall 37 and as the oil droplets collect on the wall into larger masses, said masses flow down said well to the edge 40 and into the layer of filter material 30 thus increasing the mass size of the oil in the filter cartridge and directly increasing the fluid flow in the cartridge and hence the efficiency and effectiveness of the filter material in the second stage primary filter.

What is claimed is:

Oil mist and flotation dust collecting apparatus of the character described comprising a first stage, centrifugal separator having an upstanding, outer cylindrical wall, a bottom first drain pan for the wall having a central drain opening, a hollow, cylindrically shaped upstanding second stage primary filter cartridge disposed within the upper portion of the space encompassed by the cylindrical wall and defining with said wall an annular chamber, a tangential inlet formed through the upper end of the cylindrical wall admitting a stream of contaminated air into said chamber, a second drain pan positioned below the filter cartridge and having a drain opening disposed above the drain opening in the bottom drain pan for the outer cylindrical wall, a third stage secondary filter compartment positioned above the chamber, a series of upstanding bag filters disposed in inverted positions within the compartment, a downwardly and inwardly tapering bottom wall for the compartment constituting a passageway connecting the compartment with the space encompassed by the filter cartridge, said bottom wall having a circular lower edge terminating directly above the second stage filter cartridge and directing oil collected by the bag filter into the top of the filter cartridge, a bonnet connected to the top of the third stage secondary filter compartment, and exhaust fan means connected to the bonnet whereby said exhaust fan means creates a rising stream of whirling air in the annular chamber, said stream passing through the filter cartridge and remaining effective up through the cartridge and through the passageway to the third stage secondary filter.

References Cited

UNITED STATES PATENTS

| | | | |
|---|---|---|---|
| 1,461,174 | 7/1923 | Bennett | 55—237 |
| 1,797,812 | 3/1931 | Waring | 55—341 X |
| 1,881,049 | 10/1932 | Garner et al. | 55—250 X |
| 1,928,670 | 10/1933 | McCrery | 55—341 X |
| 2,014,298 | 9/1935 | Schneible | 55—341 X |
| 2,233,167 | 2/1941 | Holm-Hansen | 55—250 X |
| 2,238,280 | 4/1941 | Nutting | 55—337 X |
| 2,239,731 | 4/1941 | Neumann | 55—251 X |
| 2,507,897 | 5/1950 | Gavagnin | 55—337 X |
| 2,514,623 | 7/1950 | Brown. | |
| 2,631,830 | 3/1953 | Carraway | 55—259 X |
| 2,756,976 | 7/1956 | Jalma | 55—235 X |
| 2,781,104 | 2/1957 | Fischer | 55—341 X |
| 2,943,698 | 7/1960 | Bishop | 55—337 X |
| 3,219,394 | 11/1965 | Moss et al. | |

FOREIGN PATENTS

| | | |
|---|---|---|
| 157,619 | 7/1954 | Australia. |
| 6,405 | 1904 | Great Britain. |
| 541,344 | 11/1941 | Great Britain. |
| 938,975 | 10/1963 | Great Britain. |
| 331,840 | 9/1958 | Switzerland. |

HARRY B. THORTON, *Primary Examiner.*

D. TALBERT, *Assistant Examiner.*